A. K. WOOD.
VALVE OPERATING MECHANISM.
APPLICATION FILED MAY 9, 1916.
1,372,326.
Patented Mar. 22, 1921.
3 SHEETS—SHEET 2.
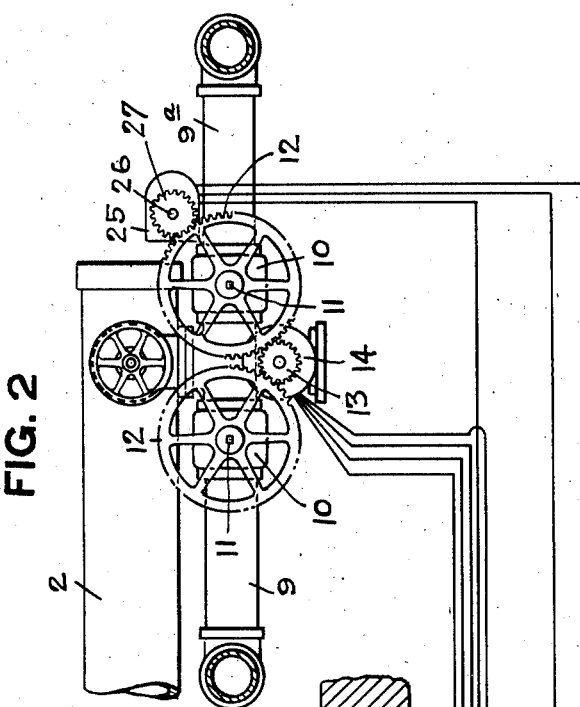
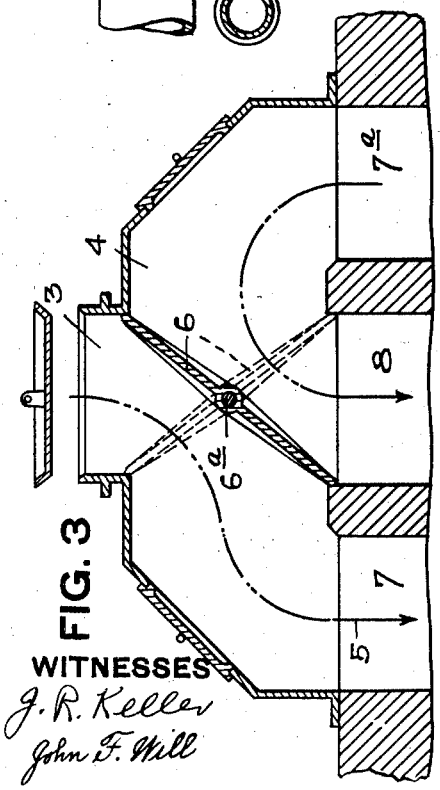
WITNESSES
J. R. Keller
John F. Will
INVENTOR
Arch K. Wood
By King Fother Powell
attys

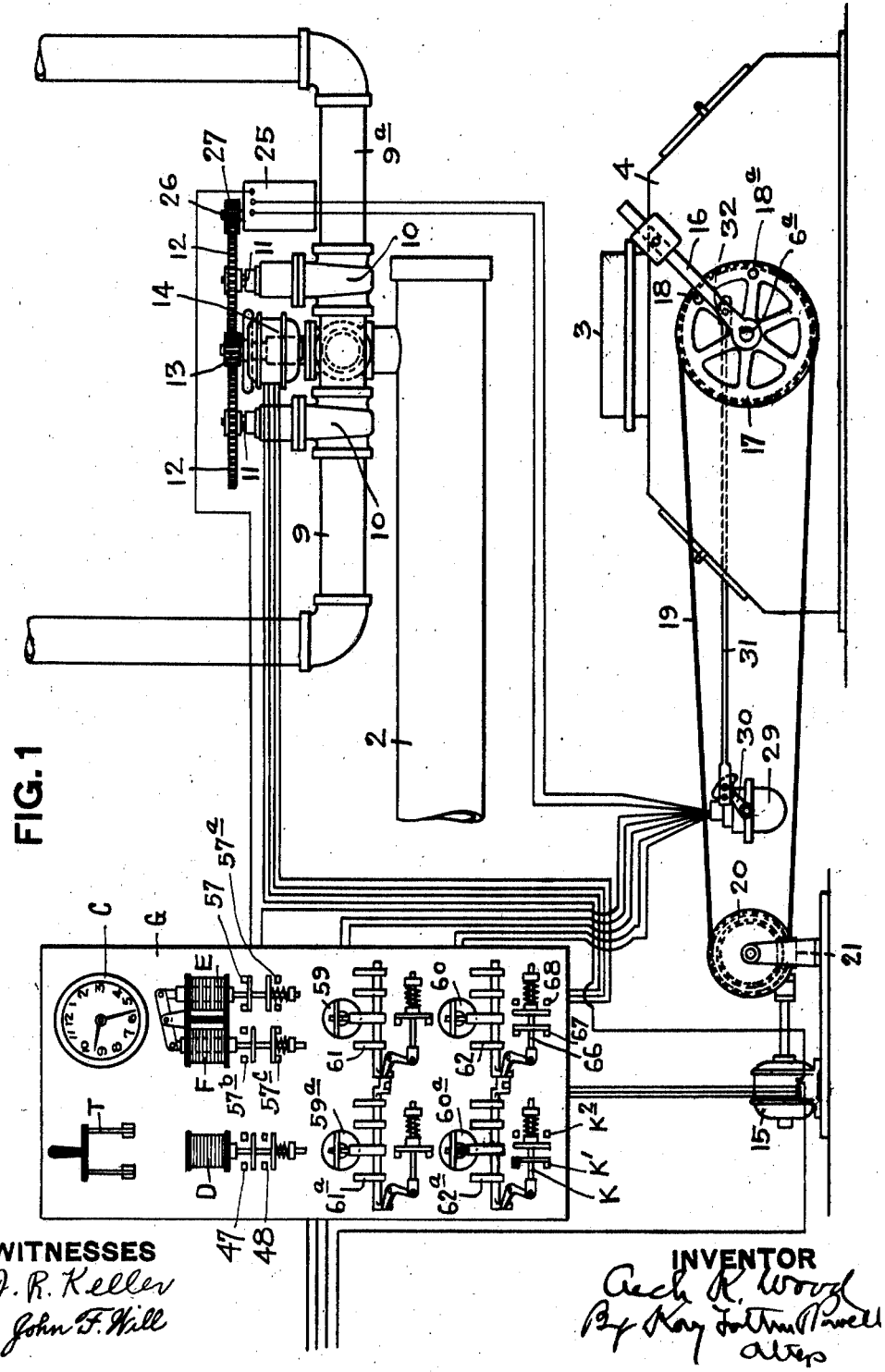

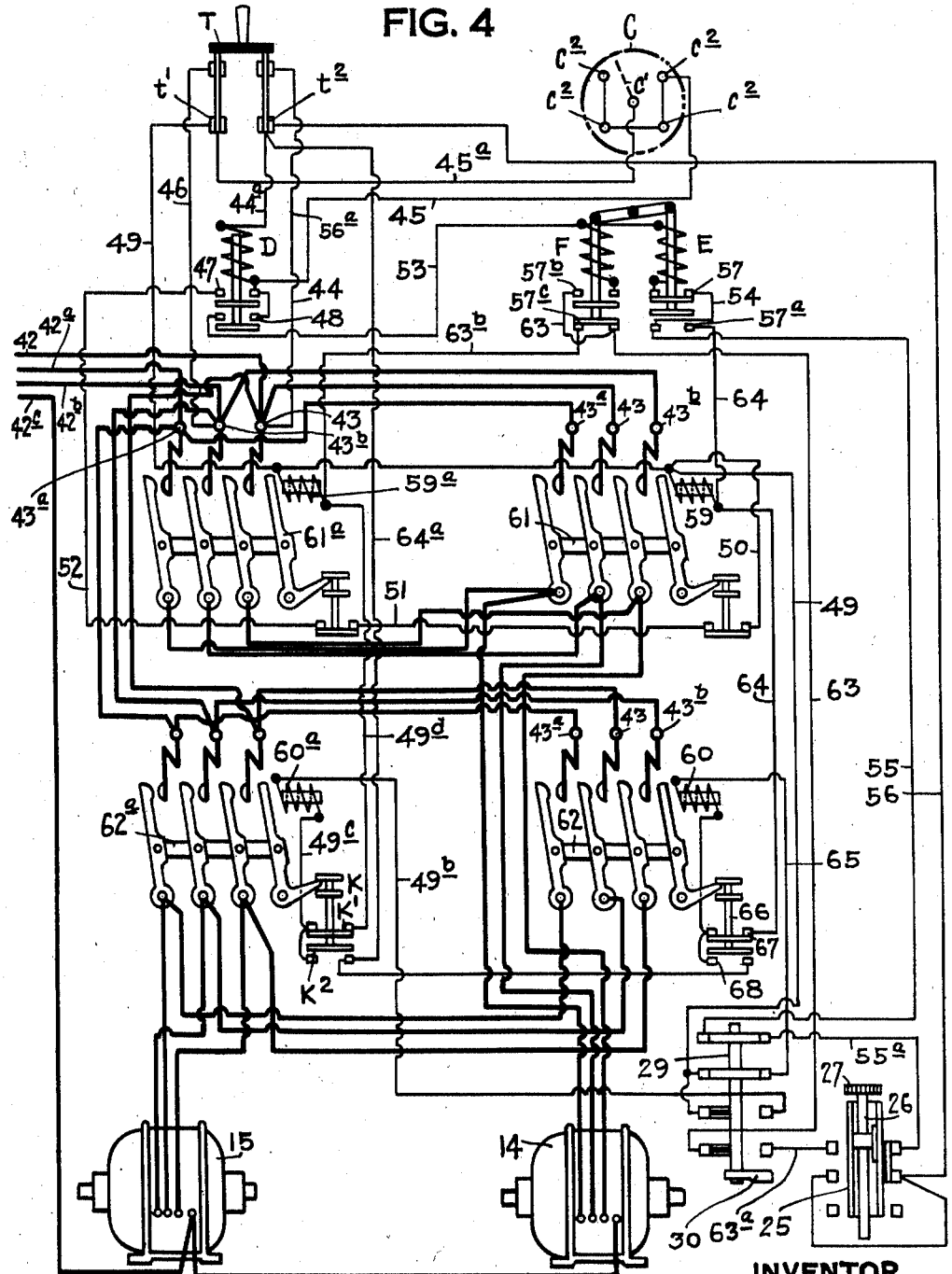

UNITED STATES PATENT OFFICE.

ARCH K. WOOD, OF JEANNETTE, PENNSYLVANIA.

VALVE-OPERATING MECHANISM.

1,372,326.  Specification of Letters Patent.  Patented Mar. 22, 1921.

Application filed May 9, 1916. Serial No. 96,295.

*To all whom it may concern:*

Be it known that I, ARCH K. WOOD, a citizen of the United States, and resident of Jeannette, in the county of Westmoreland and State of Pennsylvania, have invented a new and useful Improvement in Valve-Operating Mechanism; and I do hereby declare the following to be a full, clear, and exact description thereof.

My invention relates to valve-operating mechanism, and has particular reference to means controlling the actuating mechanism.

The object of the invention is to operate electrically valves which automatically and periodically open and close to control the flow of combustibles to regenerative furnaces.

The invention is illustrated in connection with the gas and air mains of a furnace of this type used in the manufacture of glass. The invention is applicable for use with other types of regenerators, and is adapted for controlling valves automatically in other systems, such as ventilating systems and the like, and I do not wish to restrict the invention to the particular application of, or to the mechanism employed as here shown.

In the art of glass melting where a regenerative furnace is employed, much depends upon the manner in which the flow of combustibles to the regenerators is controlled. In order to maintain a high and uniform temperature at the hearth, which is of particular importance in glass-making, absolute regularity of time interval between reversal of valves is essential. Heretofore these valve operations were performed by hand with resultant irregularity of operation and variations in temperature, and with consequent injury to the glass pots and to the furnace.

The invention is devised to obviate the above-mentioned disadvantages, and to provide automatic means of operation.

The invention consists, generally stated, in operating valves for regenerative furnaces by mechanism actuated by electric motors, and automatically controlling the motor-operating circuit.

In the accompanying drawings, Figure 1 is a general diagrammatic elevational view of gas and air mains and their valves, and connecting mechanism to the motors, and the circuit panel board; Fig. 2 is a similar view in horizontal plan arrangement; Fig. 3 is an enlarged sectional view of the reversing air valve; and Fig. 4 is a diagram of the motor-control circuit.

The numeral 2 represents the gas main, and 3 the inlet to the air duct, in this instance, the air entering through the butterfly valve 4 to chamber 7, as indicated by the arrow 5, when the valve flap 6 is in the position as shown in full lines, chamber 7 communicating with an air regenerator of the furnace (not shown). The opposite position of this flap valve puts the chamber $7^a$ in communication with an air regenerator opposite the first-mentioned regenerator; the central chamber 8 having communication with the stack for carrying off particles of combustion. This is a well-known type of butterfly valve as used with regenerative furnaces and does not need to be described further. The gas main terminates in two branches 9 and $9^a$, each branch communicating with a gas regenerator or port in the furnace, and each branch is provided with a valve, preferably a gate valve 10, as shown. These gas valves are adapted to operate alternately and simultaneously; that is to say, while one is opening, the other is closing, and both operate simultaneously with the reversing movement of the flap of the air valve.

The actuating mechanism of the gas valves comprises gearing in mesh with the pinion of an electrically-driven reversing motor, and each valve stem 11 is provided with the large spur gear 12 in mesh with a pinion 13 of the motor 14. The valves are of the usual structure, the stem being in threaded engagement with the gate of the valve, so that through rotation of the stem the gate is raised or lowered. By reason of the arrangement of gearing as here shown, the spur gears 12 traveling in the same direction of rotation, the stems of the valves have oppositely arranged threads; that is to say, one has right-handed threads and the other left-handed threads, so that, when the gears are rotated in the same direction, one valve will open while the other will close. A reverse direction of rotation of the motor alternates the opening and closing of the valves. Other arrangement of gearing may be employed for this purpose, or the valves may be operated independently of each other, but they must be operated in unison, and the closing and opening of the valves must alternate as hereinafter set forth.

The flap 6 of the air valve 4 is actuated by a flexible drive connection to the motor 15, the stem 6ª of the flap valve having keyed thereto a weighted arm 16, the weight being for the purpose of holding the valve tight to its seat. Journaled loosely on the stem between the arm and the valve casing is the sheave or cable-drum 17. This drum is provided with the pins 18 and 18ª arranged so as to lie one on each side of the arm and are adapted to engage therewith when the sheave is rotated to move the valve 6. It will be noted, that when the valve 6 lies in the position as shown in Fig. 3, the position of the arm 16 will be as shown in Fig. 1, and pin 18 will be in contact with the arm, while pin 18ª is out of contact. These pins are so positioned on the sheave as to allow starting of the small operating motor before picking up the load of moving the valve 6, and to provide for movement of the sheave through momentum after the valve seats. Sheave 17 is connected by cable 19 to a sheave 20, which is driven by the motor 15 through a worm drive, as indicated at 21. The operation of reversing this valve is as follows:

The motor 15 is a reversing motor and when driven to move the valve to the position opposite to that as shown in the drawings, the sheave 17 will be rotated, the pin 18ª moving into contact with the arm 16, and carrying it past its vertical position, when by reason of the weight of the flap valve and the weight on the arm, the valve will close by gravity, and the sheave will through momentum continue to move so that the pin 18 will stand in a position away from the arm to permit starting of the motor again in the reverse direction before picking up the load of the valve.

In the motor-operating circuit which will hereinafter be described, limit switches are employed to control the motors. These switches are of the well-known rotary type, and are mechanically actuated, and are shown in diagram, and comprise such parts as a rotating spindle, and suitable fixed and traveling contactor segments. The switch for the motor operating the gas valve is indicated by the numeral 25. The rotating contactor spindle 26 has keyed thereto a spur pinion 27 in mesh with one of the valve gears 12, and motion is imparted to the spindle through the gearing from the motor; and as the screw of the valve is rotated to open or to close the valve, corresponding travel of the contactor of the switch acts to limit or control the current to the motor.

A somewhat similar type of switch 29 is employed for controlling motor 15, the spindle of which does not make a complete rotation as in the case of the former switch. The contactor segment spindle has attached thereto a crank-arm 30, connected by rod 31, to a crank-arm 32 on the air valve shaft 6. When the motor 15 actuates said valve, motion is imparted to the switch to cause it to move to control the circuit to the motor.

The circuit connections and switch arrangement for operating the motors are shown diagrammatically in Fig. 4, the current being taken from any suitable source of supply. In order to provide for regular time intervals between reversal of valves, an electrical time contactor clock C is employed. This clock C is mounted on the panel board G, and is connected in the circuit through the closing of the hand-switch T. The clock is of a type of the well-known "demand indicators" and operates at regularly recurring time intervals to close an electrical circuit operating motor switches 61, 62, 61ª and 62ª. These switches are operated in pairs and the closing of each pair alternates with each contact of the clock at predetermined time intervals.

The current for operating the motors is shown in Fig. 4 as a two-phase current leading into the switch board on leads 42, 42ª, 42ᵇ, and 42ᶜ to binding posts 43, 43ª and 43ᵇ. The single phase current for the control circuit is from binding post 43—43ᵇ to the top of posts of switch T.

When the contactor of the clock closes a circuit through contacts C' and C² current flow is from switch T at $t'$ by lead 45ª to the clock, lead 45 to solenoid D, through the solenoid and by lead 44ª to switch T at $t^2$; completion of this circuit energizes solenoid D, which makes a circuit for solenoid E by closing contacts 47 and 48. The current for this circuit flows from switch T at $t'$; thence by leads 49, 50, 51 and 52, contacts 47 and 48, and lead 53 to solenoid E, passing through the solenoid and connections 54, and by lead 55—55ª through limit switches 29 and 25 and back to the line at $t^2$ by lead 56. Resultant energizing of solenoid E opens the circuit at 57, and closes a circuit at 57ª; this circuit establishes flow of current for energizing the magnets 59 and 60 of the main motor switches 61 and 62; current for this circuit flowing from one side of the switch T, through lead 49 to magnet 59; completion of the circuit for the magnet being through lead 64, contacts 57ª, lead 55, to switches 29 and 25, and to the opposite side of switch T by lead 56; current of lead 49 also flowing through limit switch 29 and lead 65 to the magnet 60; completion of the circuit for this magnet being through interlock 66 at 67 to the return lead 64 of magnet 54. Resultant energizing of the magnets closes the contact fingers of switches 61 and 62 establishing a circuit through the main switches for operating the motors 14 and 15; closing of switch 62, due to the energizing of magnet 60, causes interlock 66 to break the return lead 64 and 67, reëstablishment of this circuit is then through contact 68 and lead 64$^a$ to switch T.

When the switches 61 and 62 have been closed, as above described, the motors will be energized or driven by current flow from binding posts 43, 43$^a$, 43$^b$, and lead 43$^c$, through the contacts of main switch 61 and the direct line 42$^c$ to motor 14; as this is a two-phase circuit one line is direct to motors and three lines are controlled by the switch. Motor 15 is driven by main switch 62 and direct line 42$^c$ same as motor 14. Rotation of the motors actuates the limit switches 25 and 29, and when these switches have moved their required distances, the circuit of magnets 59 and 60 will be opened, resulting in demagnetization of magnets and opening of switches 61 and 62, and breaking the circuit to the motors.

Assuming that the clockwise rotation of the motors has reversed the position of valves from the position as shown in the drawings, it will be seen from the above-described operation of the circuit and switch arrangement, that when breaking of the motor circuit through switches 61 and 62 occurs, one complete cycle of valve reversal is accomplished, and the limit switches have been moved by this operation to an opposite position, and through energizing of magnet E, by reason of its lever connection to the armature of magnet F, the armature of magnet F has been moved to connect a circuit for closing the motor switches 61$^a$ and 62$^a$.

With the limit switches in the reversed position, and after proper time interval, the clock C again makes contact and the motors are rotated counter-clockwise, and through the same mechanism as above described the valves are again reversed.

The flow of current in the newly established circuit for this cycle of operation will be as follows:

Solenoid D will be energized by flow of current through the same circuit as in the former operation, when clock C makes contact. The armature of solenoid F having been previously moved through the energizing of solenoid E, connects a circuit at 57$^b$. The flow of current in this circuit to solenoid F is also the same as in the former operation; but the circuit from the solenoid will be magnet F, connection 57$^b$, lead 63 to limit switch 29, lead 63$^a$ to limit switch 25, and completion of the circuit to the switch T through lead 56. Resultant energizing of magnet F breaks the circuit at 57$^b$ and connects a circuit at 57$^c$ which energizes magnets 59$^a$ and 60$^a$ for operating the main motor switches 61$^a$ and 62$^a$. The current for this circuit flowing from the switch T at $t'$ through lead 49 to magnet 59$^a$, and from the magnet by lead 63$^b$, connection 57$^c$, lead 63 to switches 29 and 25, and back to switch T at $t^2$ by lead 56. Flow of current to magnet 60$^a$ in this circuit being as follows: lead 49 to limit switch 29, from switch 29 to magnet 60$^a$, by lead 49$^b$; completion of the circuit for this magnet being through lead 49$^c$ interlock K at K', lead 49$^d$ to the same negative side of the circuit as for magnet 59$^a$. Resultant energizing of the magnets closes switches 61$^a$ and 62$^a$ and causes separation of the circuit at K'; reëstablishment of the circuit for magnet 60$^a$ is made through connection K$^2$ to lead 64$^a$ to switch T at $t^2$. When the switches 61$^a$ and 62$^a$ have been closed as above described, current flow to the motors is transposed, and the motors energized to rotate counter-clockwise; this is effected through the arrangement of switch contacts as shown, which reverses one phase of each motor.

While I have shown and described a particular form of electrical system for automatically effecting the periodic operation of motors for reversal of the valves, it will be understood that I do not limit my invention to any particular electrical system. Any system whereby a reversal of the motor may be obtained through means having a regular periodicity of operation, under control of the movement of the valves or the valve actuating mechanism may be employed. Instead of employing motors, suitable electromagnets may be employed for actuating the valves at predetermined time intervals. It is apparent other types of valves may be employed, and the valves may be operated separately instead of in pairs for controlling the gas flow, and the actuating mechanism for the valves may be arranged differently without departing from the principle of my invention.

Having thus described my invention, what I claim and desire to secure by Letters Patent is:

1. In valve-operating mechanism, the combination with a plurality of reversibly operative valves, a source of electrical energy and a circuit therefor including electrical valve-actuating mechanism, an electromagnet circuit, automatic means controlled by the movement of the valves for energizing said circuit at predetermined time intervals, and a switch in the circuit for controlling said electrical valve-actuating mechanism to cause a reversal of the valves.

2. In valve-operating mechanism, the combination of a reversibly operable valve, an electric motor connected to operate the said valve, two reversing switches severally connected to the said motor, a motor circuit including the said switches and the said motor, and means for alternately closing the said switches, the said means comprising a switch-closing magnet for each of the said switches, a control circuit including the said magnets, and two mechanically connected electromagnetic switches interposed in the said circuit and adapted to complete the said control circuit alternately through the said magnets.

3. In valve-operating mechanism, the combination of a reversibly operable valve, an electric motor connected to operate the said valve, two reversing switches severally connected to the said motor, a motor circuit including the said switches and the said motor, and means for alternately closing the said switches, the said means comprising a switch-closing magnet for each of said switches, a control circuit including the said magnets, two mechanically connected electromagnetic switches interposed in the said circuit and adapted to complete the said control circuit alternately through the said magnets and a time-controlled switch adapted to open and close the said control circuit.

4. In valve-operating mechanism, the combination of a plurality of reversibly operable valves, an electric motor connected to operate each of said valves, two reversing switches severally connected to each of the said motors, a motor circuit including the said reversing switches and the said motors, and means for alternately closing the said reversing switches at predetermined intervals to simultaneously reverse the said motors, the said means comprising a switch-closing magnet for each of the said reversing switches, a control circuit including all of the said magnets, two mechanically connected eletromagnetic switches interposed in the said control circuit and adapted to complete the said circuit through the said magnets in alternate sets, and a time-controlled switch adapted to open and close the said control circuit at predetermined time intervals.

In testimony whereof, I the said ARCH K. WOOD, have hereunto set my hand.

ARCH K. WOOD.

Witnesses:
JOHN F. WILL,
GEO. MILLER.